United States Patent [19]
Zornes et al.

[11] Patent Number: 5,092,185
[45] Date of Patent: Mar. 3, 1992

[54] SCOTCH YOKE MECHANISM AND POWER TRANSFER SYSTEM

[75] Inventors: David A. Zornes, Redmond; Jan W. Van Wyk, Kirkland, both of Wash.

[73] Assignee: Balanced Engines, Inc., Tacoma, Wash.

[21] Appl. No.: 489,063

[22] Filed: Mar. 5, 1990

Related U.S. Application Data

[63] Continuation-in-part of Ser. No. 224,993, Jul. 27, 1988, Pat. No. 4,906,110.

[51] Int. Cl.⁵ .............................................. F16H 21/18
[52] U.S. Cl. .......................................... 74/50; 74/44; 74/49
[58] Field of Search ................................ 74/44, 49, 50

[56] References Cited

U.S. PATENT DOCUMENTS

| | | | |
|---|---|---|---|
| 2,259,196 | 10/1941 | Beckstrom | 74/50 |
| 2,270,493 | 1/1942 | Bancroft | 74/50 |
| 2,366,237 | 1/1945 | Clausen | 74/50 |
| 3,398,588 | 10/1968 | Meier | 74/50 |

Primary Examiner—Leslie A. Braun
Assistant Examiner—David W. Laub
Attorney, Agent, or Firm—Seed and Berry

[57] ABSTRACT

A Scotch yoke mechanism has a yoke frame with opposed parallel tracks engaged by rollers presented by a block assembly and is arranged to transmit power between a rotating crankshaft on a crankpin of which the block assembly is mounted and oppositely directed pistons mounted on the yoke frame, which moves linearly along a reciprocation axis. Two additional Scotch yoke mechanisms of the same type are presented by a cage surrounding the yoke frame and presenting two additional pistons opposing those of the first-mentioned Scotch yoke mechanism. The cage operates from two spaced apart crankpins which are aligned, and also moves linearly along the reciprocation axis.

32 Claims, 9 Drawing Sheets

SCOTCH YOKE MECHANISM AND POWER TRANSFER SYSTEM

CROSS-REFERENCE TO RELATED APPLICATION

This application is a continuation-in-part of our co-pending application Ser. No. 07/224,993, filed July 27, 1988 now U.S. Pat. No. 4,906,110 issued Mar. 6, 1990.

TECHNICAL FIELD

The present invention relates to Scotch yoke mechanisms for transmitting power between a piston moving linearly in simple harmonic motion, or in anharmonic motion, and a rotating crankshaft.

BACKGROUND ART

In a typical Scotch yoke mechanism, a yoke frame presents a pair of parallel inner tracks between which a roller or slide block operates in reciprocating motion. In its simplest form the yoke frame moves linearly in simple harmonic motion in a direction transverse of the tracks, and the reciprocating element in the yoke frame is pivotally connected to a rotating crank. Commonly, the yoke frame is rigidly connected to a piston rod and the reciprocating crank is on a crankshaft. When the reciprocating element is a roller, during each stroke the roller engages one of the yoke frame tracks when rolling in one direction and engages the other track when rolling in the opposite direction. Even though the tolerance between the roller diameter and the distance between the tracks is small, the roller impacts the track to which it is shifting. Typical Scotch yoke mechanisms using a roller as the reciprocating element in the yoke frame, and serving as a linkage between a crankshaft and a piston, are shown in U.S. Pat. Nos. 2,132,802 (Pierce) and 2,482,967 (Cook).

It has been discovered that in such mechanisms the roller shifts tracks before the end of its stroke and hence is forced to instantaneously change direction of rotation while finishing the stroke in engagement with the other track. Then, at the finish of the stroke, the roller is again forced to reverse its rotational direction. As a consequence, a scuffing action occurs between the roller and tracks during each stroke.

When a slide block is used as the reciprocating element in the yoke frame, because of the tolerance between the block width and the track spacing, the slide block cocks slightly until its trailing edge and diagonally opposite forward edge engage the two tracks; and when the slide block reverses direction, it cocks oppositely. This action is sometimes referred to in the art as "wedging" and results in scuffing and wear problems. Typical Scotch yoke mechanisms using a slide block as the reciprocating element in the yoke frame and functioning between a crankshaft and a piston are shown in U.S Pat. Nos. 963,880 (Eason); 1,316,192 (Sawyer); 2,127,729 (Grant) and 2,148,820 (Tucker).

In the Tucker patent, the crankshaft has a central crankpin with a slide block operating in a central yoke frame coupled to the rod of an inner piston and has a pair of outer crankpins with slide blocks operating in outer yoke frames coupled by sets of rods to an intermediate piston opposing the inner piston and an outer piston opposing an end of the crankcase. The Tucker patent also shows a double-cylinder engine arrangement in which the outer yoke frames each have a second set of rods extending oppositely from the first set. It has been discovered that with such an arrangement of outer yoke frames, respective tracks in the outer yoke frames tend to move out of parallel relationship to one another and to distort under load.

Another problem with Scotch yoke mechanisms is lubrication of the bearing for the roller or slide block providing connection with the crankpin on which the roller or slide block is mounted. This is particularly true in high speed and high thermal operating conditions and has been a limiting factor in power transfer design, particularly when external heat engines are given consideration. It has been discovered that under such thermal operating conditions that solid lubricated antifriction roller bearings will allow significantly longer operation of the scotch yoke mechanism particularly at higher temperatures.

Yet another problem is the tendency of the reciprocating scotch yoke to rotate about the reciprocation axis and thereby cause additional scuff and wear as the side edges of the scotch yoke collides with the webs of the crankshaft during operation.

DISCLOSURE OF INVENTION

The present invention aims to expand the use and life of Scotch yoke types of mechanisms by substantially eliminating the scuffing, track impact, and wear problems experienced in the past. This aim is accomplished by using a slide block journal-mounted onto a crankshaft and on said slide blocks are two pairs of antifriction rollers which are journal-mounted at opposite sides to respectively engage the two tracks of the yoke frame at substantially all times. As a result, roller/track impact and scuffing are avoided, and there is no cocking at the block. The bearings for the rollers and the main block bearing are preferably a solid-lubricant design capable of operating in a high-temperature environment.

The invention also aims to avoid track distortion and disorientation under load when a pair of outer Scotch yoke reciprocating mechanisms are used in conjunction with a central Scotch yoke reciprocating mechanism in an arrangement such as described in the Tucker patent. This aim is accomplished by rigidly coupling the two outer Scotch yoke mechanisms together as a rigid cage, and having bending moment suppression means, in the center of which the central Scotch yoke mechanism operates.

This invention further aims to improve the operation of scotch yoke mechanisms by providing guide means for preventing the scotch yoke mechanisms from turning relative to one another in the geometric planes containing each pair of slide block track rollers. Previous scotch yoke mechanisms such as disclosed in the Tucker patent do not provide means of preventing rotation of the scotch yoke frame out of the geometric plane being defined as a geometric normal plane relative to the central long axis of the reciprocating pistons. It has been discovered that such rotations will cause the structure of the scotch yoke frame to frequently collide or impact with the adjacent webs of the crankshaft, during rotation of the crankshaft, thereby causing additional scuffing, wear, and increased friction of the scotch yoke linkage mechanism during operation.

This invention yet further aims to provide a novel means of anharmonic reciprocating motion by means of shaped or profiled tracks on the Scotch yoke reciprocating mechanisms. The surface of the tracks on which the slide block rollers travel may be shaped to be planar, convex, concave, and combinations thereof. Such profiling of the tracks allows the advantage of dwell shaping the piston stroke at substantially any angular position of the rotating crankshaft relative to a top-dead-center or bottom-dead-center position of a piston. This invention is novel in the simplicity and ease with which dwell shaping can be accomplished as contrasted with all previously disclosed reciprocating piston mechanisms which require additional mechanical components such as cams, levers, and gears to accomplish dwell shaping and substantially adds complexity to the such reciprocating piston linkages. Further it has been discovered that a single roller journal mounted onto a crankpin cannot successfully operate, on a shaped or profiled track when subjected to the heavy force and thermal loads encountered in a pump or heat engine during operation, due to the fact that the single roller may be caused to change sides and thus engage either track surface when said roller is rotating in a surface tangent direction opposite to the travel path of the track thus causing scuffing to occur between the single roller and the scotch yoke frame. The present invention as herein described does not cause scuffing, or impact between the roller and the respective track, as the two pairs of aforementioned rollers, which are journal mounted onto a slide block and said slide block begin centrally journal mounted onto a crankpin, constantly engage the respective surfaces of the scotch yoke frame and therefore always rotate in a direction consistent with the respective surface travel paths.

BEST MODE FOR CARRYING OUT THE INVENTION

Figure 1:
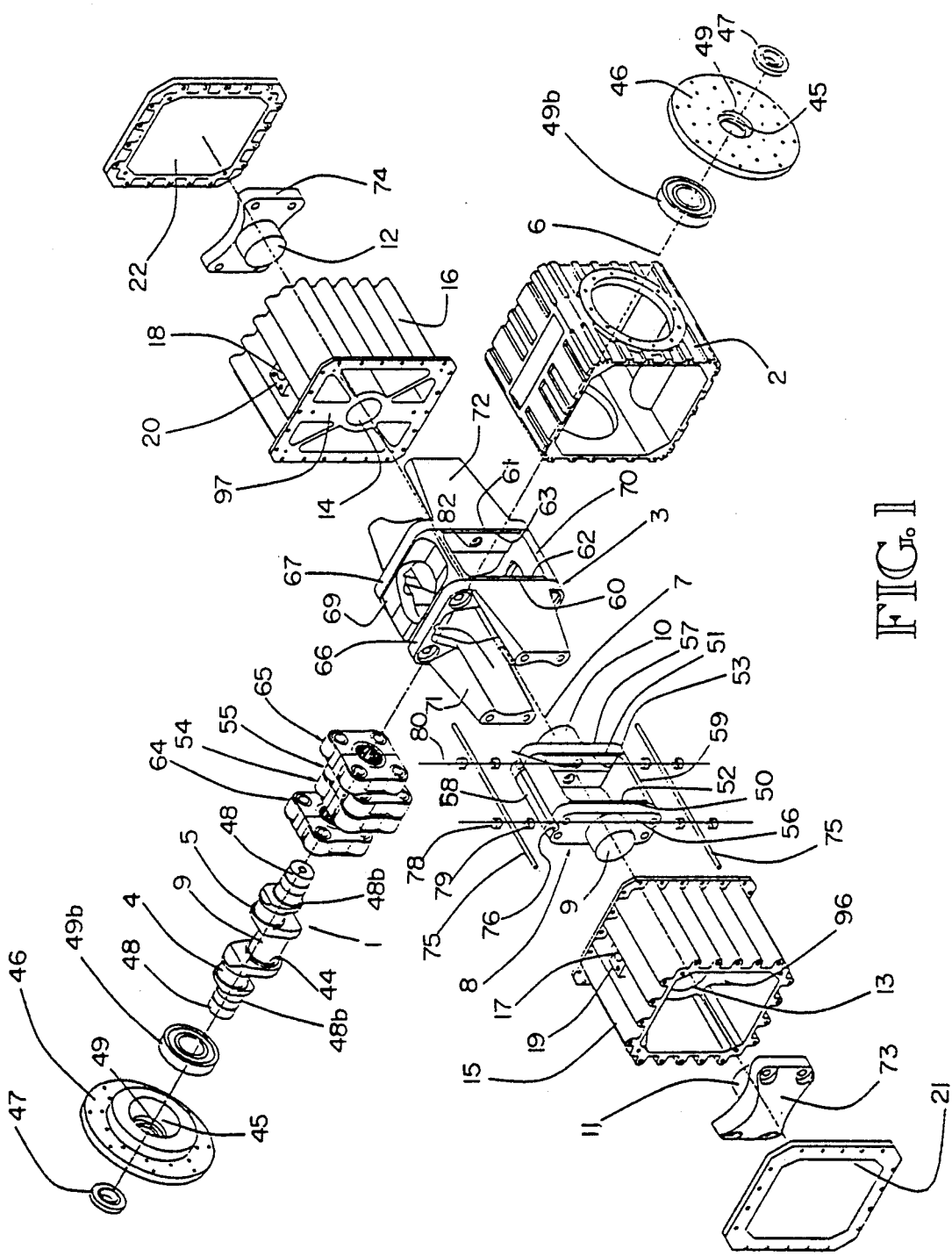
FIG. 1 is an exploded isometric view of the parts making up the mechanism of the present invention.

Referring to the drawings, a crankshaft [1] is journal-mounted in a crankcase [2] which houses a reciprocating cage [3] operating by a pair of Scotch yoke linkages from two aligned outer crankpins [4,5] rotating about rotation axis [6]. Reciprocating relative to the crankcase [2] and the cage [3] along a common reciprocation axis [7], as best seen in FIG. 1, is a central frame [8] operating by a Scotch yoke linkage from a central crankpin [8b] rotationally offset by substantially 180 degrees from the outer crankpins [4,5]. The frame [8] has a pair of outwardly facing pistons [9,10] opposed by a pair of inwardly facing pistons [11,12] presented by the cage [3]. These pistons work in a pair of cylinders [13,14] mounted respectively in extensions [15,16] of the crankcase [2]. Porting means is provided in extensions [15,16] by way of port openings [17,18] in landings [19,20] located on the exterior walls of the extensions. End plates [21,22] are attached to the outer ends of extensions [15,16] to seal the interiors of the extensions and crankcase [2] from dust and debris.

Figure 2:
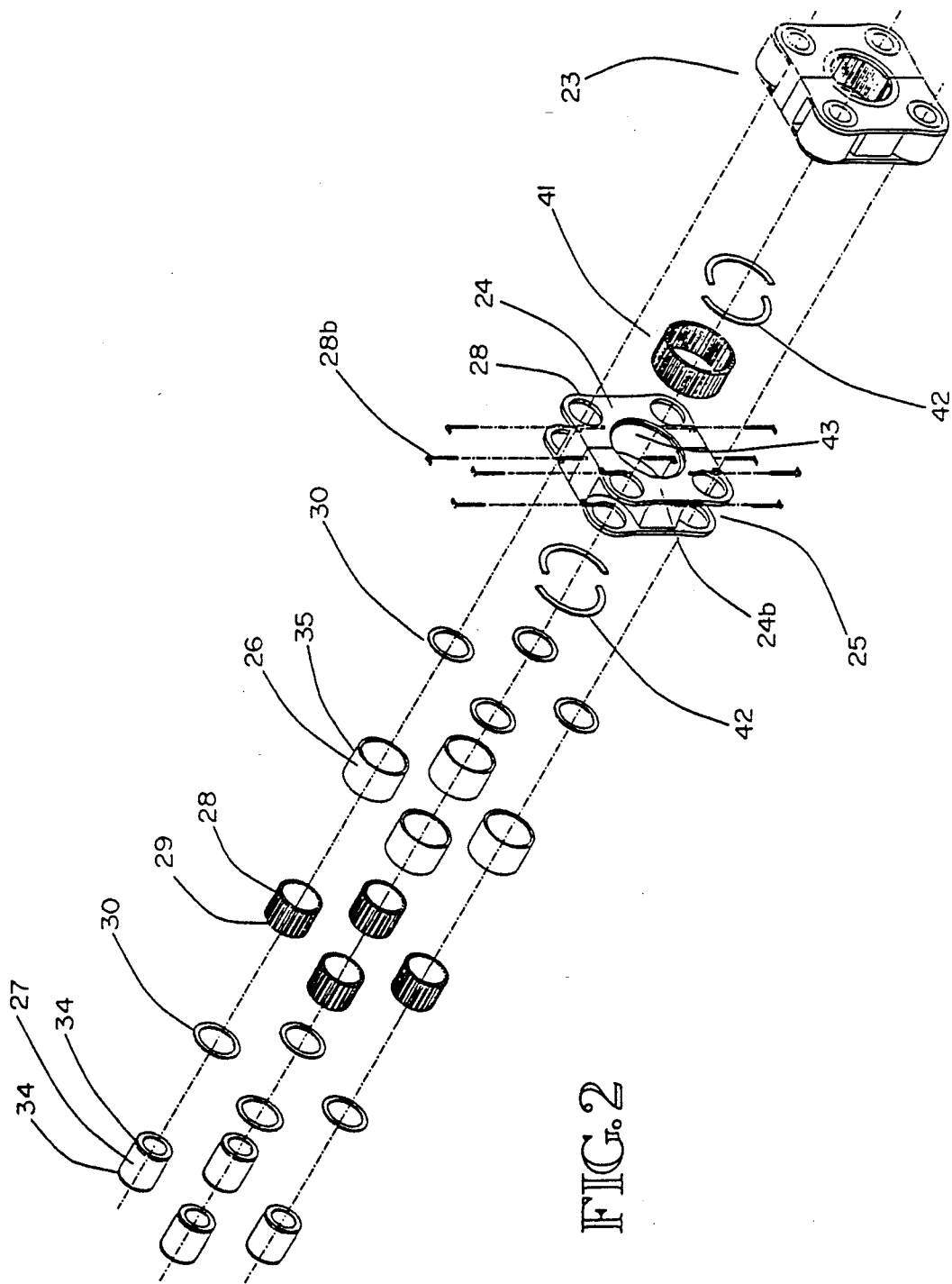
FIG. 2 is an exploded isometric view of the parts making up one of the rolling block assemblies of the invention.
Figure 3:
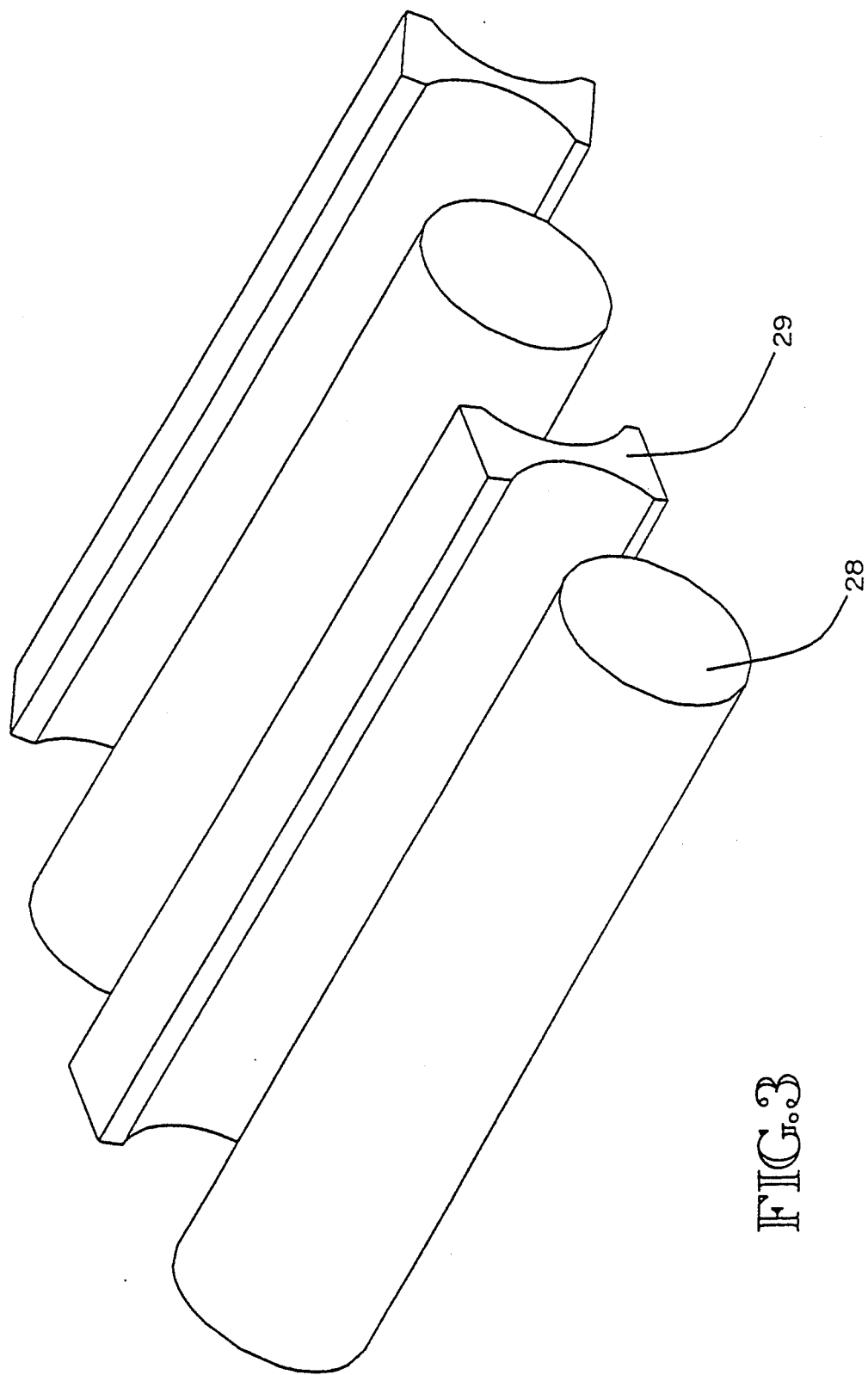
FIG. 3 is a fragmentary detail end view showing the arrangement of needles and lubricating spacers in the bearings of the rolling block assemblies.

As part of the present invention, the Scotch yoke linkages each include a rolling block unit [23] with natinc halves [24,24a] and two pairs of matching roller assemblies partially housed in corner recesses [25] in the block, as best seen in FIG. 2. Each roller assembly has a cylindrical track roller [26] turning on a pin [27] by way of bearing needles [28] separated by floating solid-lubricant spacers [29] shaped to interfit with the needles as best shown in FIG. 3. The needles [28] are loosely retained by end rings [30], which are preferably of a solid-lubricant material. The pin [27] extends through a pair of aligned holes [31] in ears [33] on each side of the respective recess [25] and is retained by locating pins [32] fitting into both the ears [33] and engaging external annular grooves [34] formed adjacent the ends of the pin [27].

Figure 4:
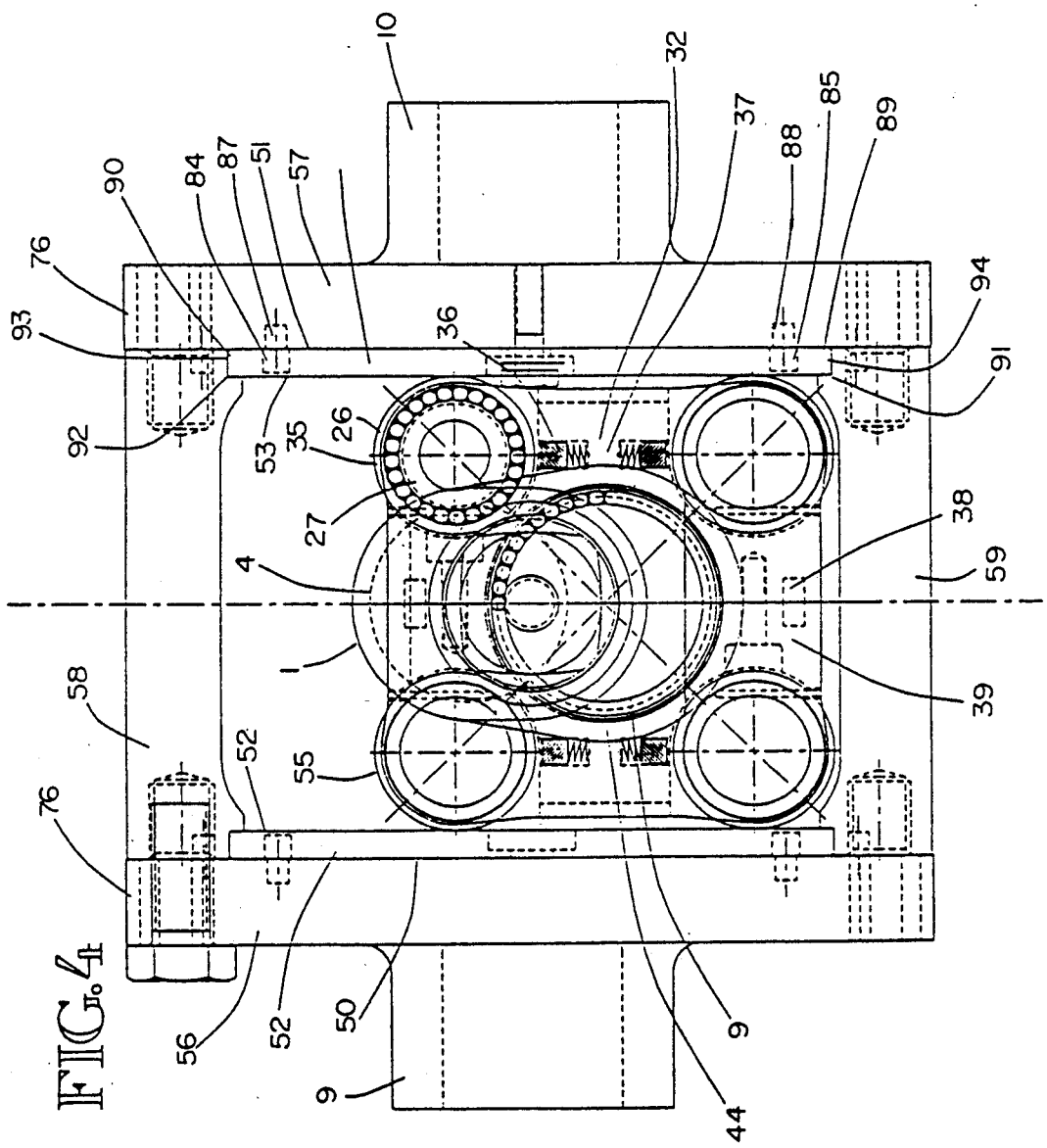
FIG. 4 is a sectional view of one of the rolling block assemblies showing the details of the track roller lubrication, and strike plate attachment.

As best seen in FIG. 4, the outer face [35] of the track rollers [26] may be lubricated by wiper shoes [36] of solid-lubricant material which are slideably mounted in bores [32] extending between the recesses [25] for each track rollers [26]. Each pair of wiper shoe [36] is biased into roller engagement by a compression spring [37], and the roller engaging faces of the shoes are preferably made concave to match the curvature of the track rollers [26].

The mating halves [24,24a] of each bearing block unit [23] aligned to one another as by press-fitted dowels [38] and affixed by cap screws [39] with heads recessed below the mold-lines of the corner recesses [25]. A central bearing [41] and washer [42] assembly and the two mating halves of the bearing block unit are bolted onto the respective crankpins prior to assembly of the aforementioned pins and track rollers. The mating halves present an outer race [43] for the needles of central bearing [41]. These needles engage the respective crankpin and are separated by floating solid-lubricant spacers interfitting with the needles in the same manner as spacers [29] interfit with needles [28]. A pair of annular end ring halves [42] of solid-lubricant material loosely retain the needles on each end of the needles and engage annular shoulders [44] provided at the ends of the crankpins to prevent engagement, with the crankshaft webs between the central crankpin [8b] and the outer crankpins [4,5] and between the outer crankpins and the outer axial end portions of the crankshaft [1]. The latter are journaled in suitable bearings mounted in central openings [45] in crank end plates [46] bolted onto either end of the crankcase [2]. A wiping end seal [47] is fitted over either end [48] of crankshaft [1] and into recess [49] of crank end plates [46] for the purpose of keeping dust and debris from freely entering into the interior of crankcase [2].

The central reciprocating frame [8] presents a pair of parallel tracks [50,51]. The tracks are fitted with a pair of removable strike plates [52,53] whereby the strike plates contain the bearing surfaces engaged by the pairs of track rollers [26] of two of the rolling block units [23], designated [54] and [55]. The strike plates are preferably ceramic. Said rolling block units [54] and [23a] are mounted side by side on the central crankpin [8b] to act in effect as a single rolling block unit centered at the reciprocation axis [7]. The tracks [50,51] are presented by parallel end members [56,57] on which the inner pistons [10,10a] are mounted, and these end members are rigidly interconnected by bolted spacers [58,59].

Figure 5:
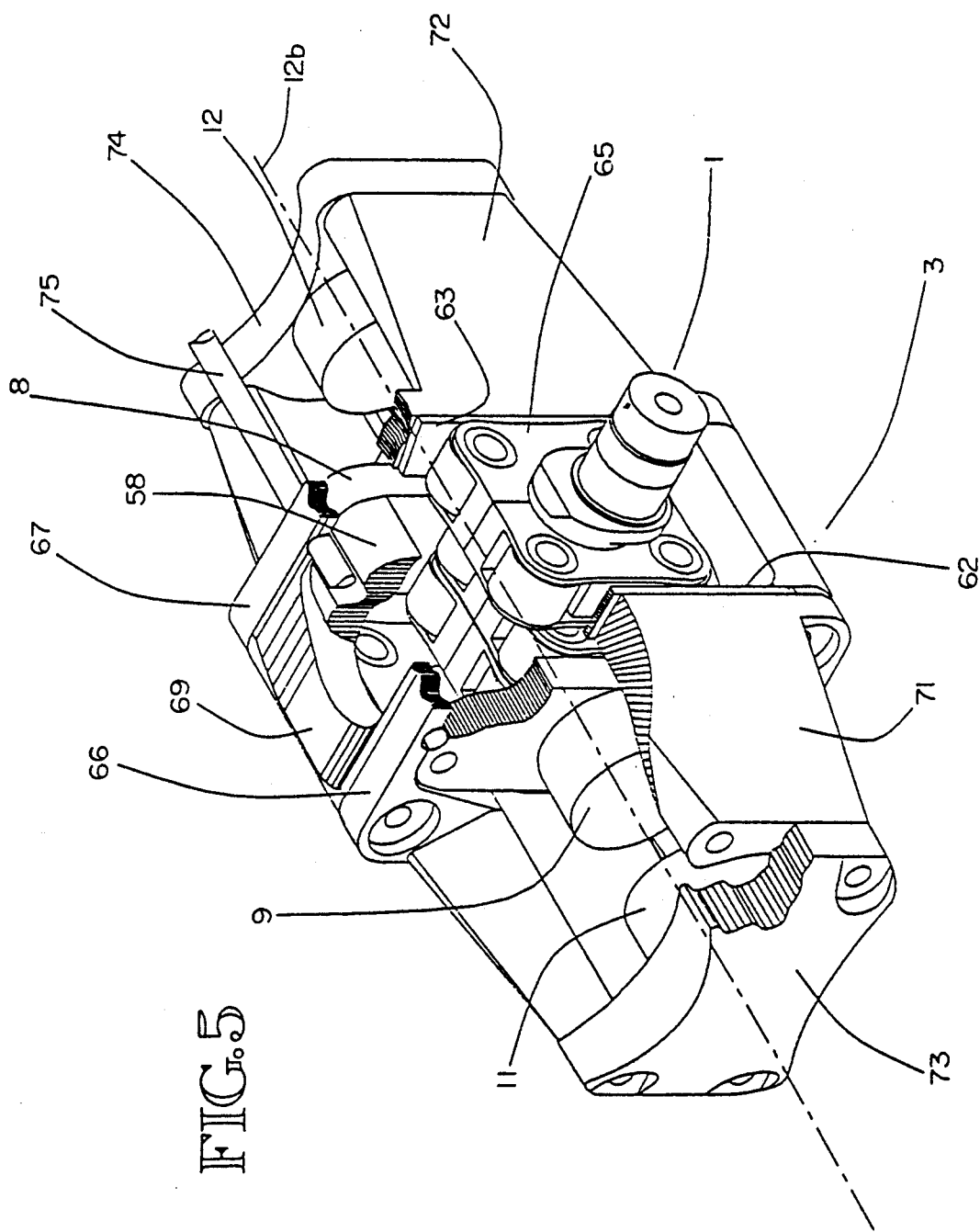
FIG. 5 is an isometric view, with parts broken away, showing the mechanism without the crankcase housing.

The cage [3] presents two pair of tracks [60,61]. The tracks are similarly fitted with removable strike plates [62,63] wherein said strike plates present hard bearing surfaces which are engaged by the pairs of rollers of two of the bearing block units [23] designated [64] and [65]. Said tracks and strike plates are spaced equal distances from the reciprocation axis [7] and are mounted on the two outer crankpins [4,5]. The tracks [60,61] are presented by two rigid parallel cross members [66,67] having aligned central openings [68] therethrough centered at the reciprocation axis [7] for passage of the central reciprocating frame [8]. The cross-members [66,67] are rigidly tied together by bolted spacers [69,70] positioned on opposite sides of the crankshaft [1]. Extending outwardly as integral extensions of the cross-members [66,67] are respective pairs [71,72] of spacer legs on the ends of which end members [73,74] are bolted. These end members present the outer pistons [11,12]. It has been found to be essential to provide a guide means so that the reciprocating cage [3] and reciprocating frame [8] be prevented from turning relative to one another and relative to the reciprocation axis [7]. This can be accomplished by providing a pair of guide rods [75] mounted parallel to the reciprocation axis [7] and held in position at their ends by an interfit with internal webs [2,16] as best seen in FIGS. 1 and 5. The central frame [8] is externally grooved at [76] and the cage [3] is internally grooved at [77] for passage for the guide rods [75]. Suitable slide bushings [78,79] are provided engaging two sides of guide rods [75] along minor axis [80] and may be mounted on the frame [8] and cage [3].

It has also been found to be essential that the bearing surfaces [52,53] engaging the respective track roller bearing block units [23], are as hard as possible over the range of operating temperatures in order to reduce the friction and thereby act to substantially improve the mechanical efficiency of the linkage mechanism. Strike plates may be made of materials such as hardened tool steels, high temperature hardened metal alloys, ceramics and composites. Strike plates made of the aforementioned materials typically exhibit a different thermal expansion rate than the members of the frame [8] and cage [3], as said members are typically made of lower cost aluminum, steel, or iron materials. The successful use of strike plates [52,53,62,63], made of ceramic materials, in load bearing structures such as the frame [8] and cage [3] requires specific design considerations be made whereby adjoining members having different thermal expansion rates are allowed to change lengths at different rates without undo buildup of stresses thereby causing distortion and failure, especially in applications where operation over a range of temperatures is desired.

Another part of this invention comprises a means of affixing strike plates [52,53] and [62,63], made of ceramic materials such as silicon nitride, to the respective tracks [50,51] and [60,61] of the reciprocating frame [8] and cage [3] members (whereby for purposes of example said members may be made of cast aluminum metal), while preventing thermal induced stresses and resultant buckling and distortion from occurring in the respective strike plates. Each strike plate [52,53] is affixed to the respective central frame tracks [50,51] by a single bolt [81] located at a central position relative to the strike plate. Similarly strike plates [62,63] are bolted to each respective track [60,61] of the outer cage [3] by single bolts located at central positions [82] relative to each strike plate. As best seen in FIGS. 1, 4, and 5, a preferred embodiment of this invention comprises a bearing block unit [23] and crankpin [8b] arranged such that neither engaged track roller contacts the head of the central bolt [81] during operation. It will be appreciated that a fully recessed bolt head [82] into the strike plate [53] would allow unlimited travel of the engaged bearing block unit [23] over the strike plate surface [53b], however the thickness of the strike plate must be substantially increased in such a case.

A means of preventing rotation of the strike plates [52,53] and [62,63] out of plane is accomplished by providing blind slots [84,85] made in strike plate [52] from the back face [86] along a central axis of strike plate [53]. One end of two press fit dowels [87,88] are each press-fitted into the track [50] along the central axis of the strike plate [52] and the protruding ends of dowels [87,88] are loosely fitted into blind slots [84,85] of strike plate [53] so as to prevent the ends [89,90] of strike plate [53] from twisting out of plane about the central bolt [81] axis while allowing the plate to grow or shrink along the length of the slot. Strike plate ends [89,90] are spaced away from the ends of notches [91] and [92] in one end of spacers [59] and [58] respectively, so as to form a clearance gap [93,94] which can accommodate the thermal expansion growth of either the strike plate [53] or track frame [8] as the components heat up and change length at different rates during operation of the mechanism.

Reciprocation of the cage [3] and frame [8] responsive to operation of the device as an engine results in power transmission to the crankshaft [1] via the block units [23], which responsively reciprocate by contact of their track rollers [26] with the strike plates [52,53] and [62,63] of tracks [50,51] and [60,61] respectively. It will be apparent that the device can be adapted to be used as an air compressor by providing standard air compressor valving and powering the crankshaft [1].

Figure 6:
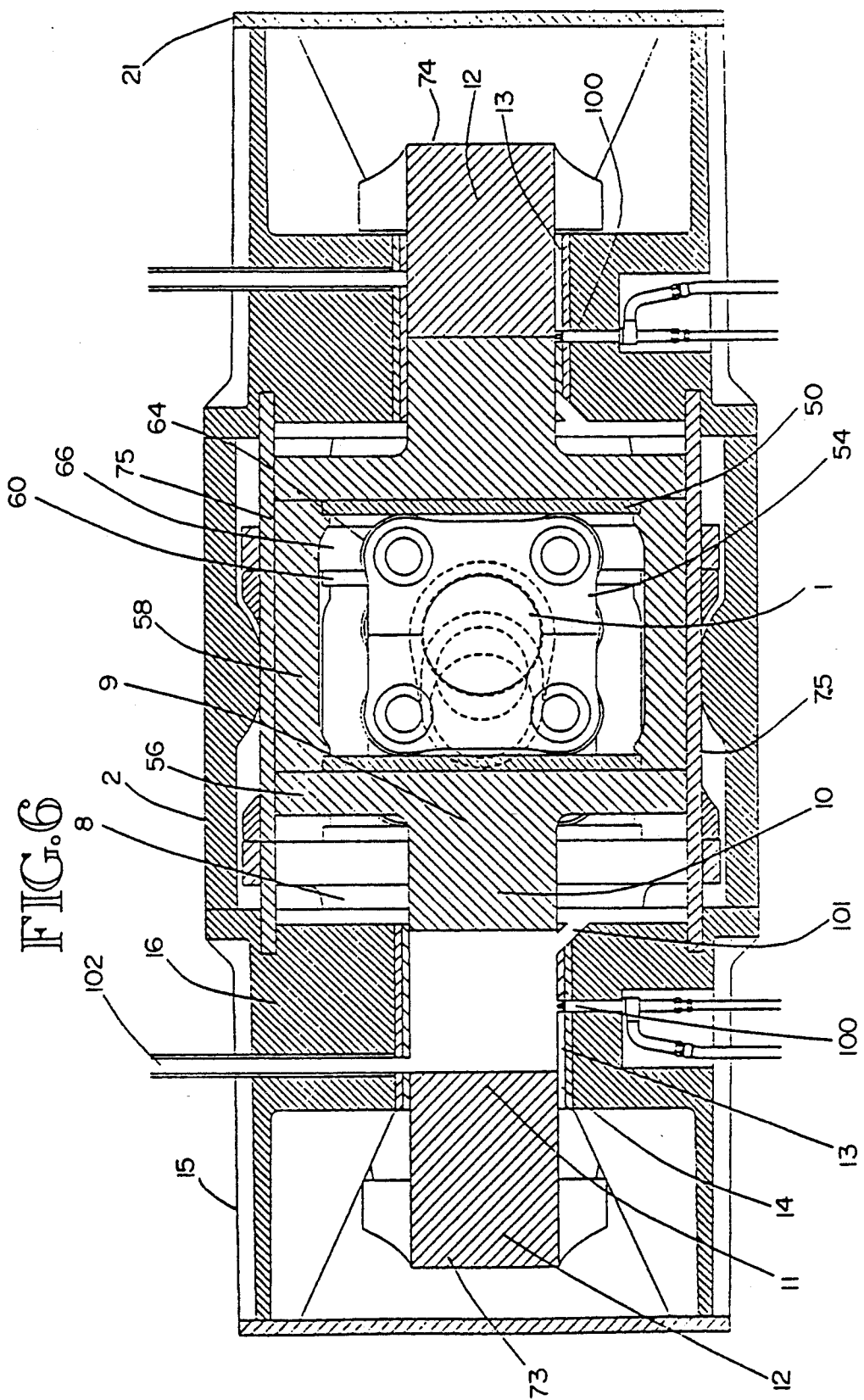
FIG. 6 is a longitudinal sectional view taken as shown by line 6—6 in FIG. 5 and with the crankcase housing in place.
Figure 7:
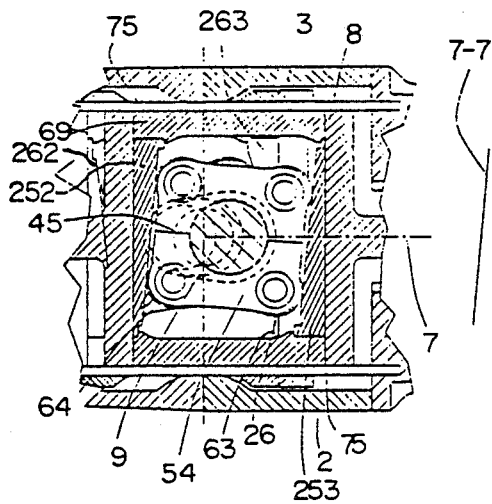
FIGS. 7-10 are break-away longitudinal sectional views illustrating four profiled strike plate configurations to achieve anharmonic motion.
Figure 9:
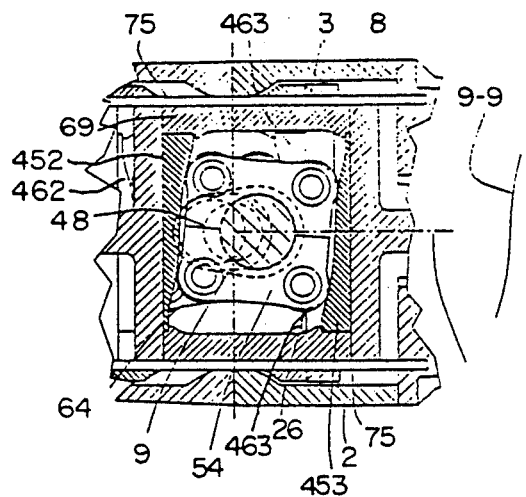
Figure 8:
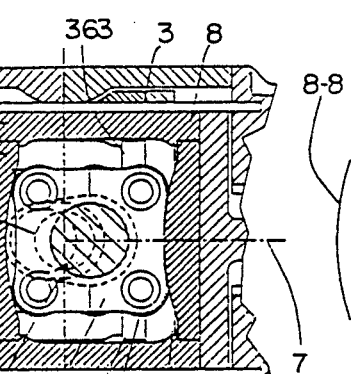

The cylinders [13,14] are supported by the internal webs [96,97] in the crankcase extensions [15,16] and may be separated from web contact by thermal insulating elements [98,99]. End plates [21,22] on the extensions [15,16] are spaced from the webs [96,97] sufficiently to allow for the strokes of the frame [8] and cage [3]. As indicated in FIG. 6, the described assembly may be operated as a diesel engine, in which case injection nozzles [100] are provided, together with intake air porting [101] and exhaust porting [102]. The central part of the crankcase [2] outside the cage [3] can function as an intake manifold. It will be appreciated that the pistons [9,10,11,12] will be provided with suitable rings, as well known in the art.

The total stroke of a power module as described in this invention, arranged as a pump or an engine, is determined by the relative phase relationship between the central crankpin [8b] and the aligned outer crankpins [4,5] of crankshaft [1] whereby maximum stroke occurs at a rotational offset angle of 180 degrees between said crankpins. The double-acting motion of the reciprocating Scotch yoke frame [8] interpenetrating Scotch yoke cage [3], results in lower piston skirt velocities relative to the cylinder walls as well as reduced mass inertia for a specified engine or pump displacement as compared to state-of-art swinging link engines.

The scotch yoke mechanism as described in this invention also results in a force and moment balance to be realized about the crankshaft rotational axis [6] resulting in a relatively vibration free engine or pump.

For purposes of example, the pairs of tracks [50,51] and [60,61] presented by the frame [8] and cage [3] have been shown as linear. When anharmonic motion along the reciprocation axis [7] is desired (for example increasing the dwell time at bottom or top of stroke in an engine without using gears or additional cam levers), the tracks may be curvilinear. However, the tracks may not necessarily be parallel in the sense that they are equidistant apart along their length, rather, the profile of one shaped track combined with the specified geometry of the bearing block will uniquely determine the profile of the other corresponding track. Only the strike plates [52,53] and [62,63] need be modified to accomplish anharmonic motion.

Figure 10:
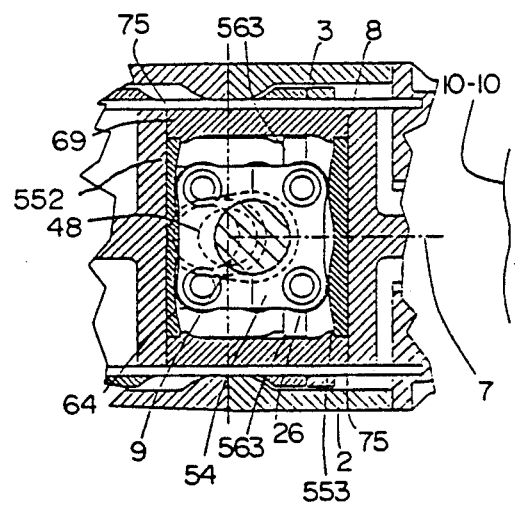

FIGS. 7-10 are breakaway views of a longitudinal section of the central region of a power module showing use of four different sets of strike plates to illustrate biased linear motion (line 7—7 in FIG. 7), U-shaped anharmonic (line 8—8 in FIG. 8), S-shaped harmonic (line 9—9 in FIG. 9), and W-shaped anharmonic (line 10—10 in FIG. 10). The identifying numerals for the strike plates have been prefixed with "2", "3", "4" and "5" in FIGS. 7, 8, 9 and 10, respectively.

Figure 11:
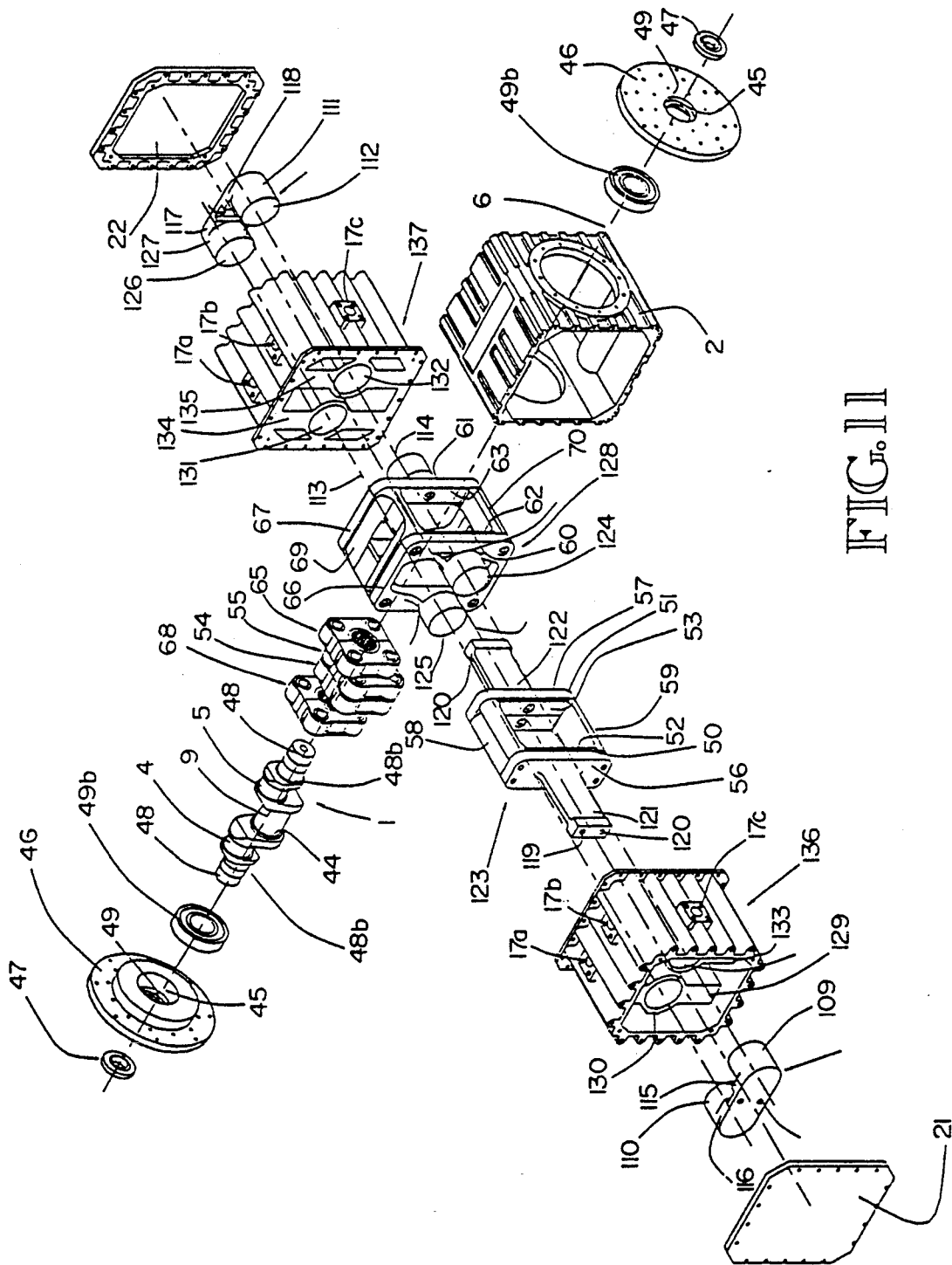
FIG. 11 is an exploded isometric view of a power module having multiple working chambers with offset reciprocation axes.

It will be further appreciated that the guide means can be accomplished without the guide rod, whereby a set of piston pairs [109,110] and [111,112], having spaced apart reciprocation axes [113,114], are affixed, by means of members [115,116] and [117,118], to the outer ends [119,120] of frame members [121] and [122], respective of the reciprocating scotch yoke frame [123], as best illustrated in FIG. 11. Said piston pairs [109,110] and [111,118] are oppositely facing a respective second set of piston pairs [124,125] and [126,127] which are affixed to each respective side of the reciprocating scotch yoke cage [128]. The pistons [109,110] attached to the same side of reciprocating frame [123] reciprocate simultaneously and in the same phase relationship and further, having said spaced apart reciprocation axes [114,113], said pistons thereby act as guide means to prevent the reciprocating frame [123] and reciprocating cage assembly [128] from significantly turning in any plane. The pairs of cylinders [129,130] and [131,132] are supported by the internal webs [133,129] and [134,135] in the crankcase extensions [136,137] and thermally insulated from web contact. End plates [21,22] on the extensions [136,137] are spaced from the webs [133,129] and [134,135] sufficiently to allow for the strokes of the frame [123] and cage [128].

It will be appreciated that four basic arrangements of double-acting pistons and cylinders having a common reciprocation axis are possible using the scotch yoke linkage mechanism as described in this invention. The four basic configurations illustrated in FIGS. 12-15 and comprise a set of reciprocating or fixed pistons and a set of reciprocating or fixed cylinders. For purposes of example the four arrangements are shown as double acting pumps with porting means and feed valve flow control means.

Figure 12:
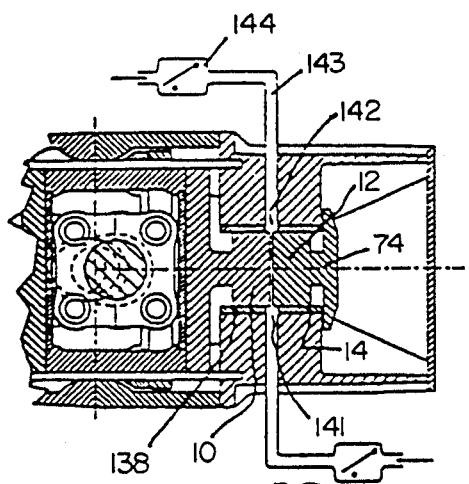
FIGS. 12-15 illustrate four basic arrangements of pistons and cylinders using the double-acting track roller scotch yoke linkage along a common reciprocation axis.

The first arrangement, shown in FIG. 12, illustrates the preferred configuration comprising a fixed cylinder [138] with reciprocating piston [10] affixed to member [57] of scotch yoke frame [8] and oppositely facing piston [12] which is affixed to member [74] of scotch yoke cage [3] and reciprocates in cylinder [14]. Port means comprises an intake valve means [139], inlet duct means [140], inlet port [141], and outlet port means [142] provided in cylinder liner [138], outlet duct means [143], and outlet valve means [144]. The crankshaft [1], crankcase [2], bearing blocks [23], spacers, strike plates, end caps, and other components are common to the four arrangements and are the same as previously described and shown in FIGS. 1 through 6.

Figure 13:
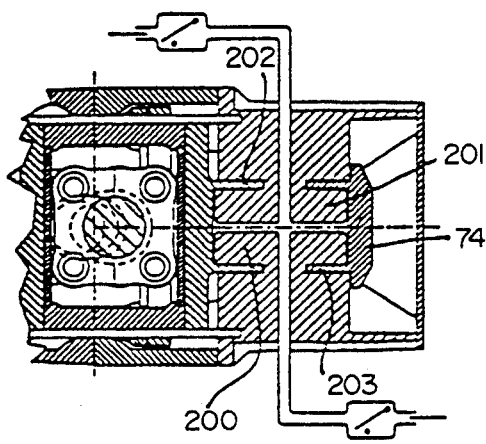

The second arrangement is shown in FIG. 13 and comprises a fixed piston unit which is integral with the crankcase extension and has two opposed fixed pistons [200,201] and two reciprocating cylinders [202,203]. Cylinder [202] is attached to the inner reciprocating frame [8] and cylinder [203] is attached to the outer reciprocating frame [74].

Figure 14:
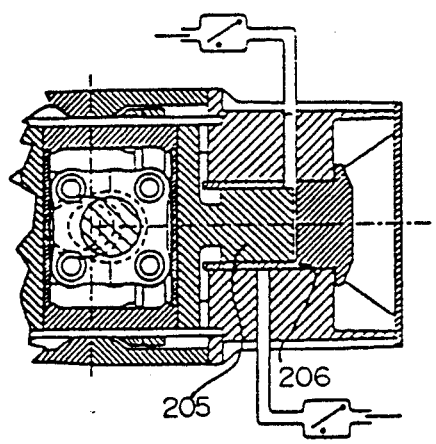

The third arrangement is shown in FIG. 14 and has a reciprocating inner piston [205] and reciprocating outer cylinder [206].

Figure 15:
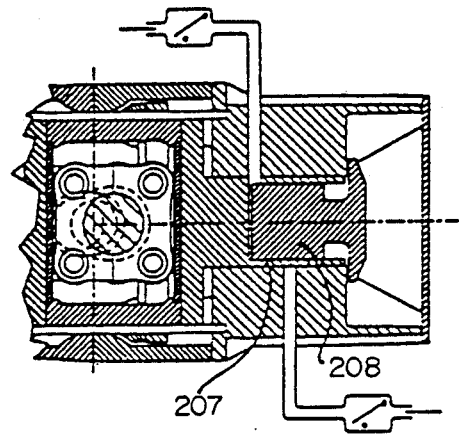

The fourth arrangement is shown in FIG. 15 and has a reciprocating inner cylinder [207] and reciprocating outer piston [208].

Arrangements other than the four shown are, of course, possible as extensions and combinations of the four basic arrangements shown; however design and performance parameters such as porting efficiency, overall power module size and weight, and operating efficiency will determine the most economic arrangement of pistons and cylinders.

It will further be appreciated that additional throws can be added to the crankshaft along with additional reciprocating pistons and cylinders, resulting in more than two reciprocating, double acting piston bodies having a common reciprocation axis and acting on a single crankshaft. For example, the action of a third set of crankthrows can be coupled to another outer reciprocating cylinder to control porting and allow supercharging of the compression chamber in a two cycle diesel engine.

Figure 16:
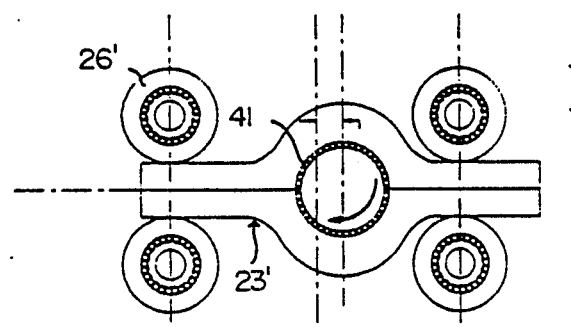
FIG. 16 shows an alternative arrangement of scotch block and rollers.

Referring to FIG. 16, instead of the track rollers [26] being journal-mounted on the rolling block units [23], the track rollers (designated 26' may be journal-mounted on the reciprocating frame [8]. In this case the rolling block units (designated 23') provide the tracks for the rollers 26'. In FIG. 16 the tracks are shown as linear, but they may have other shapes as indicated in FIGS. 12-15.

Although the .foregoing invention has been described in some detail by way of illustration and example for purposes of clarity of understanding, it will be obvious that certain changes and modifications may be practiced within the scope of the appended claims.

We claim:
1. A power transmitting device comprising:
   a housing;
   a crankshaft journal-mounted in said housing to rotate about a rotary axis and having a crankpin offset from said rotary axis;

a reciprocating force transfer member guided by said housing and arranged to move linearly in said housing along a reciprocation axis which is perpendicular to said rotary axis;

a yoke frame rigidly mounted on said force transfer member and presenting a pair of parallel tracks extending crossways to said reciprocation axis;

a reciprocating block unit between said tracks and centrally journal-mounted on said crankpin; and two pairs of rollers journal-mounted on opposite sides of said block and arranged to roll along said tracks.

2. A power transmitting device according to claim 1 in which said force transfer member has a piston on one end thereof.

3. A power transmitting device according to claim 1 in which said rollers are journal-mounted on said block unit by solid-lubricant, antifriction bearings.

4. A power transmitting device according to claim 1 in which said block unit is journal-mounted on said crank pin by a solid-lubricant, antifriction bearings.

5. A power transmitting device according to claim 1 in which said guide means are mounted in said housing.

6. A power transmitting device according to claim 1 in which said force transmitting member has two opposite ends and pistons on said opposite ends.

7. A power transmitting device according to claim 1 in which said yoke frame comprises two mating members, each having one of said tracks, and in which means clamps said mating members together such as to load said tracks against said rollers and thereby eliminate tilting of said block unit relative to said tracks during operation.

8. A power transmitting device according to claim 1 in which said tracks have guides therealong arranged to guide said rollers along parallel linear paths.

9. A power transmitting device according to claim 1 in which said block unit is split along a line parallel to said tracks for assembly over said crankpin and has bolt connections.

10. A power transmitting device according to claim 1 in which guide means are provided for preventing said yoke frame from turning relative to said reciprocation axis.

11. A power transmitting device according to claim 1 in which said block unit has corner pockets partially housing said rollers and each providing a pair of cheeks with aligned openings receiving a pin serving as an inner race for an antifriction bearing in the respective roller.

12. A power transmitting device according to claim 1 in which said rollers are lubricated by solid lubricant carried by said block unit.

13. A power transfer system comprising:

a housing;

a crankshaft having a pair of outer crankpins aligned along a first axis and having a central crankpin between said outer crankpins, said central crank having a second axis offset from said first axis, said crankshaft being journal-mounted in said housing along a rotary axis offset from said first and second axes;

a cage within said housing and having said crankshaft passing therethrough, with said crankpins being located within the cage, said cage having a reciprocation axis perpendicular to said rotary axis;

a frame arranged to reciprocate within said cage along said reciprocation axis, said cage presenting a first pair of tracks located on opposite sides of said rotary axis and defining a first pair of parallel linear travel paths, said cage also presenting a second pair of linear tracks located on opposite sides of said rotary axis and defining a second pair of parallel travel paths which are parallel to said first pair of travel paths and spaced oppositely therefrom;

said frame presenting a third pair of tracks located on opposite sides of said rotary axis and defining a third pair of parallel travel paths defining a plane containing said reciprocation axis;

an outer pair of block units centrally journaled on said outer crankpins and each arranged to travel along a respective half of said first and second pairs of travel paths;

a central block assembly journaled on said central crankpin and arranged to travel along said third pair of travel paths;

a first pair of pistons fixed on the outer ends of said frame to reciprocate along said reciprocation axis;

said cage presenting a second pair of pistons opposing said first pair of pistons;

means supported by said housing for providing working chambers between said first and second pairs of pistons; and said cage providing two first rigid connecting members between respective ends of said first pair of tracks, and two second rigid connecting members between respective ends of said second pair of tracks to prevent distortion of said first and second pairs of tracks under load.

14. A power transfer system according to claim 13 in which said outer pair of blocks each have two pairs of journaled rollers engaging respective of said pairs of tracks.

15. A power transfer system according to claim 13 in which said outer pair of blocks and central block assembly each have two pairs of journaled rollers engaging respective of said pairs of tracks.

16. A power transfer system according to claim 13 in which guide means are provided for preventing said frame and cage from turning relative to said reciprocation axis and housing.

17. A power transfer system comprising:

a housing;

a crankshaft having a pair of outer crankpins aligned along a first axis and having a central crankpin between said outer crankpins, said central crank having a second axis offset from said first axis, said crankshaft being journal-mounted in said housing along a rotary axis offset from said first and second axes;

a cage within said housing and having said crankshaft passing therethrough, with said crankpins being located within the cage, said cage having a reciprocation axis perpendicular to said rotary axis;

a frame arranged to reciprocate within said cage along said reciprocation axis, said cage presenting a first pair of tracks located on opposite sides of said rotary axis and defining a first pair of parallel linear travel paths, said cage also presenting a second pair of linear tracks located on opposite sides of said rotary axis and defining a second pair of parallel travel paths which are parallel to said first pair of travel paths and spaced oppositely therefrom;

said frame presenting a third pair of tracks located on opposite sides of said rotary axis and defining a third pair of parallel travel paths defining a plane containing said reciprocation axis;

an outer pair of block units centrally journaled on said outer crankpins and each arranged to travel along a respective half of said first and second pairs of travel paths;

a central block assembly journaled on said central crankpin and arranged to travel along said third pair of travel paths;

a first pair of pistons fixed on the outer ends of said frame to reciprocate along said reciprocation axis;

said cage presenting a second pair of pistons opposing said first pair of pistons; and guide means mounted in said housing for preventing said frame and cage from turning relative to said housing about said reciprocation axis.

18. A power transfer system according to claim 17 in which said guide means comprises a guide rod mounted at its ends on said housing and slideably engaged by said frame and cage.

19. A power transfer mechanism comprising:

a housing;

a crankshaft having a pair of outer crankpins aligned along a first axis and having a central crankpin between said outer crankpins, said central crank having a second axis offset from said first axis, said crankshaft being journal-mounted in said housing along a rotary axis offset from said first and second axes;

a cage within with said housing and having said crankshaft passing therethrough with said crankpins being located within the cage, said cage having a reciprocation axis perpendicular to said rotary axis;

a frame arranged to reciprocate within said cage along said reciprocation axis, said cage presenting a first pair of parallel tracks located on one side of said reciprocation axis and presenting a second pair of parallel tracks located on opposite sides of said reciprocation axis;

said frame presenting a central pair of parallel tracks located on opposite sides of said rotary axis, said first, second, and central pairs of parallel tracks being parallel to one another;

first and second outer blocks journaled on respective of said outer crankpins and each presenting two pairs of rollers arranged to travel along respective tracks of said first and second pairs of parallel tracks;

a central block means journaled on said central crankpin and presenting two pairs of rollers arranged to travel along respective tracks of said central pair of parallel tracks;

a first pair of pistons fixed on the outer ends of said frame to reciprocate along said reciprocation axis;

said cage presenting a second pair of pistons opposing said first pair of pistons; and cylinder means supported by said housing for providing working chambers between said first and second pairs of pistons.

20. A power transfer mechanism according to claim 19 in which said central block means comprises two side-by-side blocks, each presenting two pairs of rollers arranged to travel along respective tracks of such central pair of parallel tracks.

21. A power transfer mechanism according to claim 19 in which all of said rollers have solid-lubricant, antifriction bearings.

22. A power transfer mechanism according to claim 21 in which said outer blocks and central block means are journaled on said outer crankpins and central crankpin by solid-lubricant, antifriction bearings.

23. A power transmitting device comprising:

a housing;

a crankshaft journal-mounted in said housing to rotate about a rotary axis and having a crankpin offset from said rotary axis;

a reciprocating force transfer member guided by said housing and arranged to move linearly in said housing along a reciprocation axis which is perpendicular to said rotary axis;

a yoke frame rigidly mounted on said force transfer member and presenting a pair of parallel tracks extending crossways to said reciprocation axis;

a reciprocating bearing block unit between said tracks and centrally journal-mounted on said crankpin;

a pair of strike plates fitted to said parallel tracks; and two pair of rollers journal-mounted on opposite sides of said block and arranged to engage and roll along the outer surfaces of said strike plates.

24. A power transmitting device according to claim 23 in which said strike plates are arranged such that the ends are free to thermally expand along a plane parallel to the travel path of said rollers to prevent distortion of said plates during conditions of changing temperatures.

25. A power transmitting device according to claim 23 in which said strike plates are made of ceramic materials.

26. A power transmitting device according to claim 1 in which said force transmitting member has cylinders on one end thereof.

27. A power transmitting device according to claim 1 in which said force transmitting member has two opposite ends and cylinders on said opposite ends.

28. A power transmitting device according to claim 1 in which said force transmitting member has an end with a reciprocating cylinder thereon; and a stationary piston affixed to said housing and arranged to interfit with said reciprocating cylinder.

29. A power transfer mechanism comprising:

a housing;

a crankshaft having a pair of outer crankpins aligned along a first axis and having a central crankpin between said outer crankpins, said central crank having a second axis offset from said first axis, said crankshaft being journal-mounted in said housing along a rotary axis offset from said first and second axes;

a cage within with said housing and having said crankshaft passing therethrough with said crankpins being located within the cage, said cage having a reciprocation axis perpendicular to said rotary axis;

a frame arranged to reciprocate within said cage along said reciprocation axis, said cage presenting a first pair of parallel tracks located on one side of said reciprocation axis and presenting a second pair of parallel tracks located on opposite sides of said reciprocation axis;

said frame presenting a central pair of parallel tracks located on opposite sides of said rotary axis, said first, second, and central pairs of parallel tracks being parallel to one another;

first and second outer blocks journaled on respective of said outer crankpins and each presenting two pairs of rollers arranged to travel along respective tracks of said first and second pairs of parallel tracks;

a central block means journaled on said central crankpin and presenting two pairs of rollers arranged to travel along respective tracks of said central pair of parallel tracks;

a first pair of cylinders fixed on the outer ends of said frame to reciprocate along said reciprocation axis;

said cage presenting a second pair of pistons opposing said first pair of cylinders;

cylinder means supported by said housing for providing working chambers between said first pair of reciprocating cylinders and said second pair of pistons; and means for providing porting means for said working chambers.

30. A power transfer system comprising:

a housing;

a crankshaft having a pair of outer crankpins aligned along a first axis and having a central crankpin between said outer crankpins, said central crankpin having a second axis offset from said first axis, said crankshaft being journal-mounted in said housing along a rotary axis offset from said first and second axes;

a cage within said housing and having said crankshaft passing therethrough, with said crankpins being located within the cage, said cage having a reciprocation axis perpendicular to said rotary axis;

a frame arranged to reciprocate within said cage along said reciprocation axis, said cage presenting a first pair of tracks located on opposite sides of said rotary axis and defining a first pair of parallel linear travel paths, said cage also presenting a second pair of linear tracks located on opposite sides of said rotary axis and defining a second pair of parallel travel paths which are parallel to said first pair of travel paths and spaced oppositely therefrom;

said frame presenting a third pair of tracks located on opposite sides of said rotary axis and defining a third pair of parallel travel paths defining a plane containing said reciprocation axis;

an outer pair of block units centrally journaled on said outer crankpins and each arranged to travel along a respective half of said first and second pairs of travel paths;

a central block assembly journaled on said central crankpin and arranged to travel along said third pair of travel paths;

a first pair of cylinders fixed on the outer ends of said frame to reciprocate along said reciprocation axis;

said cage presenting a second pair of pistons opposing said first pair of cylinders; and guide means mounted in said housing for preventing said frame and cage from turning relative to said housing about said reciprocation axis.

31. A power transfer system comprising:

a housing;

a crankshaft having a pair of outer crankpins aligned along a first axis and having a central crankpin between said outer crankpins, said central crank having a second axis offset from said first axis, said crankshaft being journal-mounted in said housing along a rotary axis offset from said first and second axes;

a cage within said housing and having said crankshaft passing therethrough, with said crankpins being located within the cage, said cage having a reciprocation axis perpendicular to said rotary axis;

a frame arranged to reciprocate within said cage along said reciprocation axis, said cage presenting a first pair of tracks located on opposite sides of said rotary axis and defining a first pair of parallel linear travel paths, said cage also presenting a second pair of linear tracks located on opposite sides of said rotary axis and defining a second pair of parallel travel paths which are parallel to said first pair of travel paths and spaced oppositely therefrom;

said frame presenting a third pair of tracks located on opposite sides of said rotary axis and defining a third pair of parallel travel paths defining a plane containing said reciprocation axis;

an outer pair of block units centrally journaled on said outer crankpins and each arranged to travel along a respective half of said first and second pairs of travel paths;

a central block assembly journaled on said central crankpin and arranged to travel along said third pair of travel paths;

a first pair of cylinders fixed on the outer ends of said frame to reciprocate along said reciprocation axis;

said cage presenting a second pair of pistons opposing said first pair of cylinders;

means supported by said housing for providing working chambers between said first pair of cylinders and second pairs of pistons;

means for providing porting means for said working chambers; and said cage providing two first rigid connecting members between respective ends of said first pair of tracks, and two second rigid connecting members between respective ends of said second pair of tracks to prevent distortion of said first and second pairs of tracks under load.

32. A power transfer system comprising:

a housing;

a crankshaft having a pair of outer crankpins aligned along a first axis and having a central crankpin between said outer crankpins, said central crank having a second axis offset from said first axis, said crankshaft being journal-mounted in said housing along a rotary axis offset from said first and second axes;

a cage within said housing and having said crankshaft passing therethrough, with said crankpins being located within the cage, said cage having a reciprocation axis perpendicular to said rotary axis;

a frame arranged to reciprocate within said cage along said reciprocation axis, said cage presenting a first pair of tracks located on opposite sides of said rotary axis and defining a first pair of parallel linear travel paths, said cage also presenting a second pair of linear tracks located on opposite sides of said rotary axis and defining a second pair of parallel travel paths which are parallel to said first pair of travel paths and spaced oppositely therefrom;

said frame presenting a third pair of tracks located on opposite sides of said rotary axis and defining a third pair of parallel travel paths defining a plane containing said reciprocation axis;

an outer pair of block units centrally journaled on said outer crankpins and each arranged to travel along a respective half of said first and second pairs of travel paths;

a central block assembly journaled on said central crankpin and arranged to travel along said third pair of travel paths;

a first double pair of spaced apart pistons fixed on the outer ends of said frame to reciprocate along said reciprocation axis;

said cage presenting a second double pair of spaced apart pistons opposing said first double pair of spaced apart pistons;

means supported by said housing for providing pair of spaced apart working chambers between said first and second double pairs of spaced apart pistons; and means providing porting means for said working chambers.

* * * * *